Figure 1:
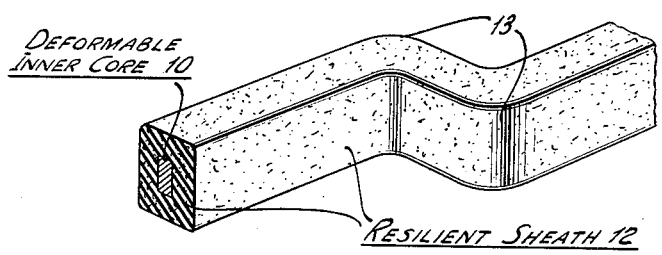

Jan. 1, 1946.  H. C. COURI  2,392,024
ARTICLE OF MANUFACTURE
Filed Feb. 9, 1945

INVENTOR.
HARRIET COLE COURI.
BY
ATTORNEY.

Patented Jan. 1, 1946

2,392,024

UNITED STATES PATENT OFFICE 2,392,024

ARTICLE OF MANUFACTURE

Harriet Cole Couri, Woodstock, Conn.

Application February 9, 1945, Serial No. 576,925

1 Claim. (Cl. 46—162)

This invention relates to improvements in articles of manufacture and more particularly pertains to the production of a product of inherent stability, which is essentially rigid but bendable.

The product of my invention preferably contains an internal core made of a bendable, relatively soft material, enveloped in an external sheath or coating of a resilient or elastic material. The product is adapted for any use in which it is desirable to combine a core of inherent stability, with characteristics which will permit of the ready deformation thereof in conformity with the use to which the product is to be put, with an enveloping sheath of resilient material to present a soft external surface.

As will be apparent from a reading of the specification with reference to the accompanying drawing, the uses to which the invention may be put are many and varied; it is intended, in the specification and drawing, to illustrate the utilization of the invention in certain specific examples by way of illustration but not in limitation; other applications and uses will become apparent from a consideration of the examples given.

Figure 2:
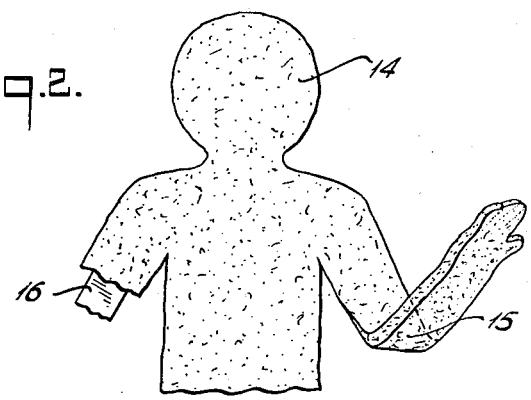
Figure 3:
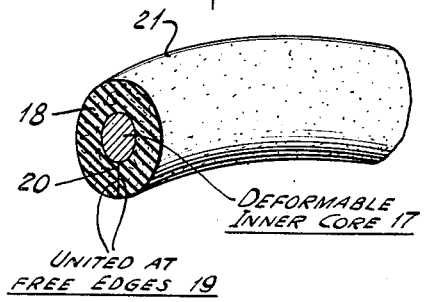

In the drawing:

Fig. 1 is a fragmentary perspective view of an article of manufacture embodying my invention, Fig. 2 is a fragmentary plan view of a form of article of manufacture embodying my invention, made in simulation of a figure, and Fig. 3 is a fragmentary perspective view of a further form of article of manufacture embodying my invention.

In Fig. 1 there is shown an embodiment of my invention for the production of an article having an inner core 10 which is deformable so that the same may be bent as at 13 to define a desired outline or conform to the use to which the article is to be put, said deformable core being of inherent stability so that it would normally tend to retain its outline, but being subject to deformation as desired.

For this purpose, the inner core 10 preferably may be made of a relatively soft metal, alloy or the like, of inherently stable characteristics, but which may be readily deformed when so desired. It may comprise a single rod or strand as illustrated in Fig. 1, or a plurality of rods or strands. It may be perforate or imperforate and may have such external configuration as is suitable in view of the use to which the article is to be put. The core may be made of lead or lead alloy, or of zinc or zinc alloy or of any other alloy or material suitable for the purpose.

The enveloping sheath 13 is preferably of a resilient material and preferably completely encompasses the deformable inner core 10 so as to provide the same with an external relatively soft surface, without impairing the inherently stable and deformable characteristics of the inner core.

I have found it convenient to utilize an external sheath of sponge rubber for the purpose, but any other resilient material having the characteristics required in accordance with the disclosure herein may be substituted therefor within the scope of this invention. The resilient sheath may have a smooth, roughened, or other desired finish imparted thereto in any desired or convenient manner.

The resilient sheath may be applied to the inner core by any desired or convenient expedient, such as, for example, by molding the same around the inner core or by the utilization of other processes for the attainment of the same end.

In Fig. 1 I have shown the article of manufacture as comprising a substantially elongated bar which may be deformed as at 13.

In Fig. 2 there is illustrated the application of the invention to the production of an article of manufacture in simulation of a figure, wherein the inner core 16 is enveloped in the resilient sheath 14, the inner core and resilient sheath being formed in simulation of the outline of a figure for the purpose of, for example, manufacturing dolls, manikins and the like. The completed article is deformable as illustrated for example, at 15, wherein the arm portion thereof is shown as bent to a third dimension.

As shown in Fig. 3, the deformable inner core 17 may be enveloped in a sheath 18, the latter being preferably made in flat form with the free edges 19 thereof united at 20, for the envelopment of the inner core, by any suitable means, as, for example, by the application of an extraneous uniting agent such as an adhesive agent, sewing or the like, by heat treatment or by any other means found convenient or desirable. Articles of furniture, jewelry, toys, and any other desired articles of manufacture may be made in accordance with my invention.

If desired, the completed articles of manufacture may be subjected to additional manufacturing processes, as will be apparent to those skilled in this art. They may, for example, be covered in any convenient or desired manner for the protection thereof or to impart surface ornamentation or data thereto or thereon.

The examples given of the various forms in which the invention may be practised are intended to be simply by way of illustration and shall not be interpereted to in any sense limit the uses to which the invention may be put, within the scope of my invention; as before stated, the invention comprises essentially an internal core of inherent stability which may be deformed at the will of the user or manufacturer of the article, and which is provided with a resilient external sheath.

Having thus described my invention what I claim as new and desire to secure by Letters Patent is:

An article of manufacture comprising an internal core of uniform thickness, made of flat soft, bendable metal, said core being formed in the outline of a complete figure, and a relatively thick external sheath of resilient material enveloping and conforming to said core, said sheath being originally in flat form, the free edges of said sheath being secured together to envelop the core in the sheath and to cover the outline of the complete figure defined by the internal core with the sheath, the completed article being deformable.

HARRIET COLE COURI.